(12) United States Patent
Yoshida et al.

(10) Patent No.: US 9,160,018 B2
(45) Date of Patent: Oct. 13, 2015

(54) FUEL CELL SYSTEM, CONTROL METHOD FOR THE FUEL CELL SYSTEM, AND ELECTRIC VEHICLE EQUIPPED WITH THE FUEL CELL SYSTEM

(75) Inventors: Michio Yoshida, Miyoshi (JP); Tadaichi Matsumoto, Okazaki (JP); Atsushi Imai, Gamagori (JP); Tomoya Ogawa, Toyota (JP)

(73) Assignee: TOYOTA JIDOSHA KABUSHIKI KAISHA, Toyota-Shi (JP)

(*) Notice: Subject to any disclaimer, the term of this patent is extended or adjusted under 35 U.S.C. 154(b) by 1000 days.

(21) Appl. No.: 13/258,719

(22) PCT Filed: Mar. 18, 2010

(86) PCT No.: PCT/IB2010/000563
§ 371 (c)(1),
(2), (4) Date: Sep. 22, 2011

(87) PCT Pub. No.: WO2010/112999
PCT Pub. Date: Oct. 7, 2010

(65) Prior Publication Data
US 2012/0013183 A1 Jan. 19, 2012

(30) Foreign Application Priority Data
Mar. 31, 2009 (JP) ................................. 2009-085378

(51) Int. Cl.
H01M 8/04 (2006.01)
(52) U.S. Cl.
CPC ...... *H01M 8/04559* (2013.01); *H01M 8/04223* (2013.01); *H01M 8/04664* (2013.01); *H01M 8/04679* (2013.01); *H01M 8/04955* (2013.01); *H01M 2250/20* (2013.01); *Y02E 60/50* (2013.01); *Y02T 90/32* (2013.01); *Y10T 307/50* (2015.04)

(58) Field of Classification Search
CPC ..................... H01M 8/04223; H01M 8/04559; H01M 8/04664; H01M 8/04679
USPC .......................................................... 429/429
See application file for complete search history.

(56) References Cited

U.S. PATENT DOCUMENTS
2002/0164511 A1 11/2002 Uozumi

FOREIGN PATENT DOCUMENTS
JP 2007-026891 A 2/2007
WO 2008/004564 A1 1/2008

OTHER PUBLICATIONS
International Search Report issued Jul. 1, 2010 in PCT/IB2010/000563 & Written Opinion (previously filed).

*Primary Examiner* — Ula C Ruddock
*Assistant Examiner* — Frank Chernow
(74) *Attorney, Agent, or Firm* — Kenyon & Kenyon LLP

(57) ABSTRACT

A fuel cell system includes: a secondary cell; a voltage converter provided between the secondary cell and a load; a fuel cell; an FC relay that turns on and off electrical connection between the fuel cell and the shared electrical path; an electrical leakage detector that detects electrical leakage in an electrical system; and a control portion that performs determination regarding electrical leakage. The control portion has: start means for starting the fuel cell by raising voltage of the fuel cell from a starting voltage to an operation voltage that is lower than an open-circuit voltage; and electrical leakage determination means for performing the determination regarding electrical leakage after a predetermined time elapses, when the FC relay is closed while a voltage difference between the voltage of the fuel cell and voltage supplied from the voltage converter to the load is greater than a predetermined threshold value.

9 Claims, 6 Drawing Sheets

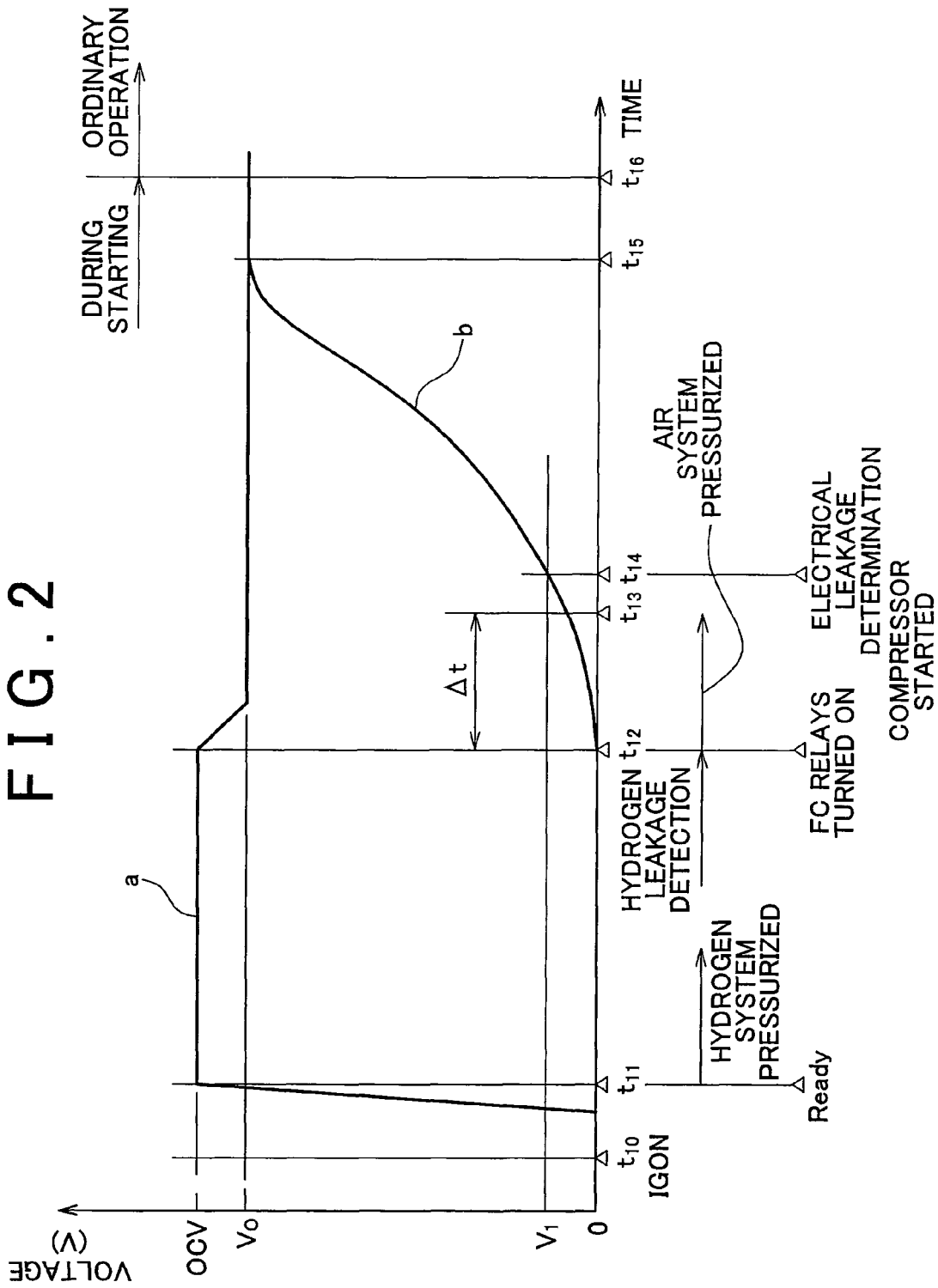

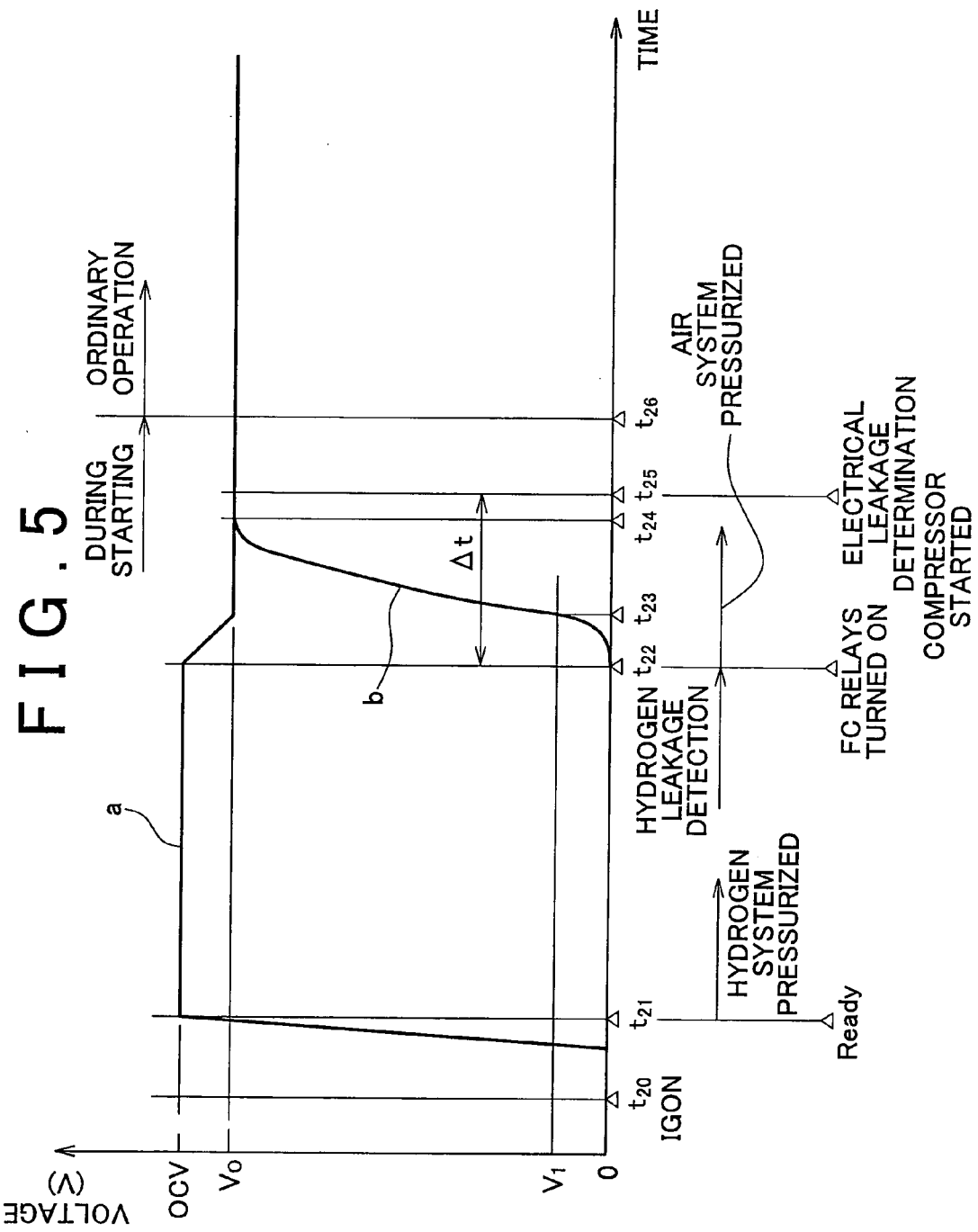

FUEL CELL SYSTEM, CONTROL METHOD FOR THE FUEL CELL SYSTEM, AND ELECTRIC VEHICLE EQUIPPED WITH THE FUEL CELL SYSTEM

FIELD OF THE INVENTION

The invention relates to fuel cell system, a control method for the fuel cell system, and a control that is performed on an electric vehicle equipped with the fuel cell system, at the time of starting the electric vehicle.

BACKGROUND OF THE INVENTION

Practical application of a fuel cell that supplies hydrogen as a fuel gas to a fuel electrode, and that supplies air as an oxidant gas to an oxidant electrode, and that generates electricity through an electrochemical reaction between hydrogen and oxygen in the air while producing water on an oxidant electrode is now being considered.

In such a fuel cell, if at the time of start of operation, the pressure of hydrogen supplied to the fuel electrode and the pressure of air supplied to the oxidant electrode are about equal to the respective pressures occurring during ordinary operation, it sometimes happens that hydrogen gas and air are unevenly distributed in the fuel electrode and the oxidant electrode, respectively, and the electrodes are degraded by electrochemical reaction caused by the uneven distribution of these gases. Japanese Patent Application Publication No. 2007-26891 (JP-A-2007-26891) discloses a method of preventing the degradation of the electrodes of a fuel cell by causing the pressures of hydrogen and air supplied to the fuel electrode and the oxidant electrode, respectively, at the time of start of operation of the fuel cell to be higher than the ordinary supplied pressures of these gases.

However, if hydrogen gas and air are supplied at high pressure to a fuel cell when the fuel cell starts operation, it sometimes happen that the rate of rise of the voltage of the fuel cell becomes large so that the voltage of the fuel cell overshoots its upper-limit voltage. In conjunction with this problem, Japanese Patent Application Publication No. 2007-26891 (JP-A-2007-26891) discloses a method in which when hydrogen gas and air are supplied, at the time of starting a fuel cell, at pressures that are higher than their pressures given during ordinary power generation, output electric power is extracted from the fuel cell, and is put out to a vehicle driving motor, resistors, etc., provided that the voltage of the fuel cell reaches a predetermined voltage that is lower than the upper-limit voltage.

In a fuel cell system mounted in an electric vehicle, an FC relay is provided for turning on and off the connection between the fuel cell and an electric motor. Using the FC relay, the fuel cell is cut off from a load system when the fuel cell is stopped, and the fuel cell is connected to the load system when the fuel cell starts operation. However, there is possibility of the FC relay being welded or damaged if large current flows through the FC relay when the FC relay is closed to connect the fuel cell and the load system.

A countermeasure for the foregoing possibility or risk is to use a method in which when the fuel cell starts, the voltage of the fuel cell is temporarily raised to an open-circuit voltage to attain a state where current does not flow out of the fuel cell, and then the FC relay is connected, and after that, the voltage is lowered so that electric output is supplied from the fuel cell. This is because the fuel cell has a characteristic that if the voltage rises to the open-circuit voltage, the output current becomes zero. However, if the voltage of the fuel cell is raised to the open-circuit voltage, the high voltage can affect the durability of the fuel cell.

Besides, in some cases, at the time of starting the fuel cell, the FC relay is connected while the voltage of the fuel cell is low, so that large current does not flow when the FC relay is connected. In such cases, however, the difference in voltage between the electrical system and the fuel cell is likely to be large, giving rise to the possibility that the transitional current occurring at the time of connecting the FC relay may cause an electrical leakage detector to falsely detect electrical leakage, and therefore the control portion may stop the fuel cell system.

SUMMARY OF THE INVENTION

Accordingly, the invention provides a fuel cell system that restrains the false determination regarding electrical leakage without impairing the durability thereof when the fuel cell starts operation, and also provides a control method for the fuel cell system, and an electric vehicle equipped with the fuel cell system.

A first aspect of the invention relates to a fuel cell system. This fuel cell system includes: a secondary cell that is chargeable and dischargeable; a voltage converter provided between the secondary cell and a load; a fuel cell that generates electricity through an electrochemical reaction between a fuel gas and an oxidant gas, and that supplies electric power to the load via a shared electrical path that the fuel cell shares with a voltage converter; an FC relay that turns on and off electrical connection between the fuel cell and the shared electrical path; an electrical leakage detector that detects electrical leakage in an electrical system that includes the secondary cell, the voltage converter, and the fuel cell; and a control portion that performs determination regarding electrical leakage. The control portion has: start means for starting the fuel cell by raising voltage of the fuel cell from a starting voltage to an operation voltage that is lower than an open-circuit voltage; and electrical leakage determination means for performing the determination regarding electrical leakage after a predetermined time elapses, when the FC relay is closed while a voltage difference between the voltage of the fuel cell and voltage supplied from the voltage converter to the load is greater than a predetermined threshold value.

The electrical leakage determination means may perform the determination regarding electrical leakage after the voltage of the fuel cell reaches a predetermined voltage after the FC relay is closed.

The predetermined voltage related to the electrical leakage determination means may be the operation voltage.

The predetermined time related to the electrical leakage determination means may be a time required until a capacitor included in an internal circuit of the electrical leakage detector is charged.

A second aspect of the invention relates to an electric vehicle. This electric vehicle is equipped with the foregoing fuel cell system.

A third aspect of the invention relates to a control method for a fuel cell system. The fuel cell system includes: a secondary cell that is chargeable and dischargeable; a voltage converter provided between the secondary cell and a load; a fuel cell that generates electricity through an electrochemical reaction between a fuel gas and an oxidant gas, and that supplies electric power to the load via a shared electrical path that the fuel cell shares with a voltage converter; an FC relay that turns on and off electrical connection between the fuel cell and the shared electrical path; and an electrical leakage detector that detects electrical leakage in an electrical system that includes the secondary cell, the voltage converter, and the fuel cell. The control method for the fuel cell system includes: starting the fuel cell by raising voltage of the fuel cell from a starting voltage to an operation voltage that is lower than an open-circuit voltage; and performing the determination regarding electrical leakage after a predetermined time elapses, when the FC relay is closed while a voltage difference between the voltage of the fuel cell and voltage supplied from the voltage converter to the load is greater than a predetermined threshold value.

The invention achieves an effect of being able to restrain false determination regarding electrical leakage without impairing the durability of the fuel cell at the time of starting the fuel cell.

BRIEF DESCRIPTION OF THE DRAWINGS

The foregoing and further features and advantages of the invention will become apparent from the following description of preferred embodiments with reference to the accompanying drawings, wherein like numerals are used to represent like elements and wherein:

FIG. 2 is a graph showing rises of voltage when the fuel cell system of the embodiment of the invention starts operating;

FIG. 5 is another graph showing rises of voltage in another condition of the start of the fuel cell system in the embodiment of the invention.

DETAILED DESCRIPTION OF THE EMBODIMENTS

Figure 1:
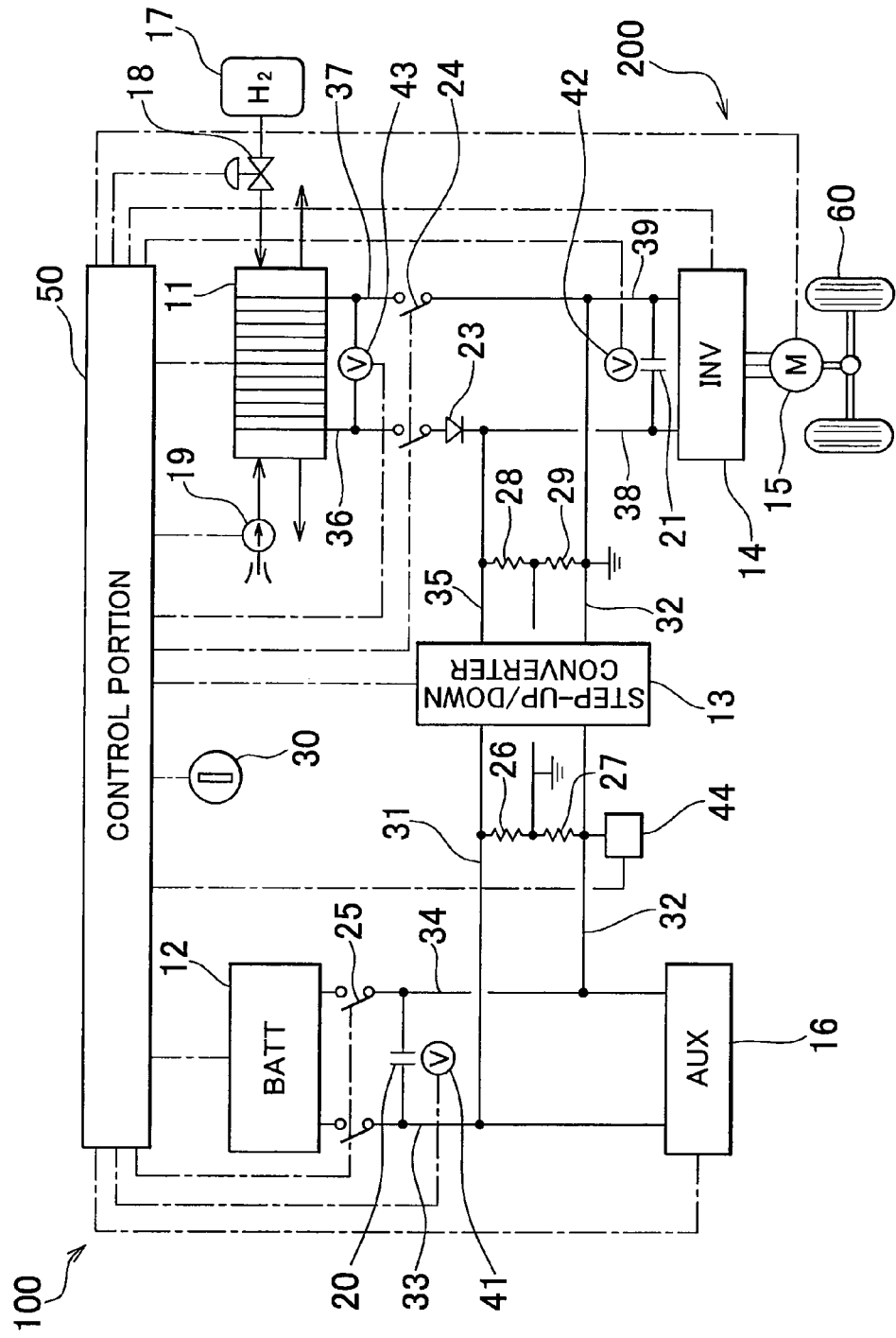
FIG. 1 is a system diagram of a fuel cell system in an embodiment of the invention.

As shown in FIG. 1, a fuel cell system 100 mounted in an electric vehicle 200 includes a chargeable and dischargeable secondary cell 12, a step-up/down voltage converter 13 that raises or lowers the voltage of the secondary cell 12, an inverter 14 that converts direct-current electric power of the step-up/down voltage converter 13 into alternating-current electric power, and supplies the electric power to a traction motor 15, and a fuel cell 11.

The secondary cell 12 is constructed of a chargeable and dischargeable lithium-ion battery, or the like. The voltage of the secondary cell 12 in this embodiment is lower than the drive voltage of the traction motor 15. However, the voltage of the secondary cell is not limited so, but may also be a voltage that is equivalent to or higher than the drive voltage of the traction motor. The step-up/down voltage converter 13 includes a plurality of switching elements, and converts a primary-side voltage supplied from the secondary cell 12 to a secondary-side voltage for driving the traction motor, by the on/off operations of the switching elements. The step-up/down voltage converter 13 is a non-insulated bidirectional DC/DC converter whose reference electrical path 32 is connected to both a minus-side electrical path 34 of the secondary cell 12 and a minus-side electrical path 39 of the inverter 14, and whose primary-side electrical path 31 is connected to a plus-side electrical path 33 of the secondary cell 12, and whose secondary-side electrical path 35 is connected to a plus-side electrical path 38 of the inverter 14. Besides, the plus-side electrical path 33 and the minus-side electrical path 34 of the secondary cell 12 are each provided with a system relay 25 that turns on and off the connection between the secondary cell 12 and a load system.

The fuel cell 11 is supplied with a hydrogen gas, which is a fuel gas, and with air, which is an oxidant gas, and generates electric power though an electrochemical reaction between the hydrogen gas and the oxygen in the air. In the fuel cell 11, the hydrogen gas is supplied from a high-pressure hydrogen tank 17 to a fuel electrode (anode) via a hydrogen supply valve 18, and the air is supplied to an oxidant electrode (cathode) by an air compressor 19. A plus-side electrical path 36 of the fuel cell 11 is connected to the secondary-side electrical path 35 of the step-up/down voltage converter 13 via an FC relay 24 and a blocking diode 23. A minus-side electrical path 37 of the fuel cell 11 is connected to the reference electrical path 32 of the step-up/down voltage converter 13 via another FC relay 24. The secondary-side electrical path 35 of the step-up/down voltage converter 13 is connected to the plus-side electrical path 38 of the inverter 14, and the reference electrical path 32 of the step-up/down voltage converter 13 is connected to the minus-side electrical path 39 of the inverter 14. The plus-side electrical path 36 and the minus-side electrical path 37 of the fuel cell 11 are connected to the plus-side electrical path 38 and the minus-side electrical path 39, respectively, of the inverter 14, via the FC relays 24. The FC relays 24 turn on and off the connection between the load system and the fuel cell 11. When the FC relays 24 are closed, the fuel cell 11 is connected to the secondary side of the step-up/down voltage converter 13, so that the electric power generated by the fuel cell 11 is supplied together with the secondary-side electric power of the secondary cell 12 obtained by raising the voltage of the primary-side electric power of the secondary cell 12, to the inverter, which thereby drives the traction motor 15 that rotates wheels 60. At this time, the voltage of the fuel cell 11 becomes equal to the output voltage of the step-up/down voltage converter 13 and to the input voltage of the inverter 14. Besides, the air compressor 19, and accessories 16 of the fuel cell 11 that include a cooling water pump, a hydrogen pump, etc., are supplied with drive electric power from the secondary cell 12.

A primary-side capacitor 20 that smoothes the primary-side voltage is connected between the plus-side electrical path 33 and the minus-side electrical path 34 of the secondary cell 12. The primary-side capacitor 20 is provided with a voltage sensor 41 that detects the voltage between the two ends of the primary-side capacitor 20. Besides, a secondary-side capacitor 21 that smoothes the secondary-side voltage is provided between the plus-side electrical path 38 and the minus-side electrical path 39 of the inverter 14. The secondary-side capacitor 21 is provided with a voltage sensor 42 that detects the voltage between the two ends of the secondary-side capacitor 21. The voltage across the primary-side capacitor 20 is a primary-side voltage $V_L$ that is the input voltage of the step-up/down voltage converter 13, and the voltage across the secondary-side capacitor 21 is a secondary-side voltage $V_H$ that is the output voltage of the step-up/down voltage converter 13. Besides, a voltage sensor 43 that detects the voltage of the fuel cell 11 is provided between the plus-side electrical path 36 and the minus-side electrical path 37 of the fuel cell 11.

Discharge resistors 26 and 27 are connected in series between the primary-side electrical path 31 of the step-up/down voltage converter 13 that is on its input side, and the reference electrical path 32 of the step-up/down voltage converter 13. An intermediate point between the two resistors 26 and 27 is grounded. Similarly, discharge resistors 28 and 29 are connected in series between the secondary-side electrical path 35 of the step-up/down voltage converter 13 that is on its output side, and the reference electrical path 32 of the step-up/down voltage converter 13. An intermediate point between the two resistors 28 and 29 is grounded. Besides, an electrical leakage detector 44 that detects electrical leakage from the electrical system is attached to the reference electrical path 32. A detection circuit provided within the electrical leakage detector 44 includes a capacitor.

A control portion 50 is a computer that contains a CPU that performs signal processing, and a storage portion that stores programs and control data. The fuel cell 11, the air compressor 19, the hydrogen supply valve 18, the step-up/down voltage converter 13, the inverter 14, the traction motor 15, the accessories 16, the FC relays 24, and the system relays 25 are connected to the control portion 50, and are constructed so as to operate according to commands from the control portion 50. Besides, the secondary cell 12, the voltage sensors 41 to 43, and the electrical leakage detector 44 are separately connected to the control portion 50, and are constructed so that the state of the secondary cell 12, and detection signals of the voltage sensors 41 to 43 and the electrical leakage detector 44 are input to the control portion 50. The electric vehicle 200 is provided with an ignition key 30 that is a switch for starting and stopping the fuel cell system 100. The ignition key 30 is connected to the control portion 50, and is constructed so that an on/off-signal of the ignition key 30 is input to the control portion 50.

Operations of the fuel cell system 100 constructed as described above will be described with reference to FIG. 2 to FIG. 4. In FIG. 2, a line a shows the secondary-side voltage $V_H$ that is the output voltage of the step-up/down voltage converter 13, and a line b shows the FC voltage $V_F$ that is the voltage of the fuel cell 11. The fuel cell 11 is started from a state of zero voltage as shown in FIG. 2.

When a driver, that is, an operating person, turns on the ignition key 30 at time $t_{10}$ shown in FIG. 2, the on-signal from the ignition key 30 is input to the control portion 50. When the on-signal of the ignition key 30 is input, the control portion 50 closes the system relays 25 to connect the secondary cell 12 to the system, so that the primary-side capacitor 20 is charged by the electric power supplied from the secondary cell 12. After that, the control portion 50 starts the voltage raising operation of the step-up/down voltage converter 13 to start the charging of the secondary-side capacitor 21, as shown in steps S101 and S102 in FIG. 3. The control portion 50 raises the secondary-side voltage $V_H$ while detecting the secondary-side voltage $V_H$ via the voltage sensor 42, as shown in step S103 in FIG. 3. When the secondary-side voltage $V_H$ reaches the open-circuit voltage OCV, the charging of the secondary-side capacitor 21 is completed, and the supply of electric power from the secondary cell 12 becomes possible. Therefore, at time $t_{11}$ shown in FIG. 2, the control portion 50 lights a READY lamp to indicate that the preparation for supplying electric power to the traction motor 15 has been completed. When the driver depresses an accelerator pedal after the READY lamp is lighted, the electric power from the secondary cell 12 is supplied to the traction motor 15 that rotates the wheels 60, so that the electric vehicle 200 can start to move. Although electric power is supplied from the secondary cell 12 to the traction motor 15, electric power does not flow into the fuel cell 11 since the FC relays 24 are open and therefore the fuel cell 11 is cut off from the system.

Figure 3A:
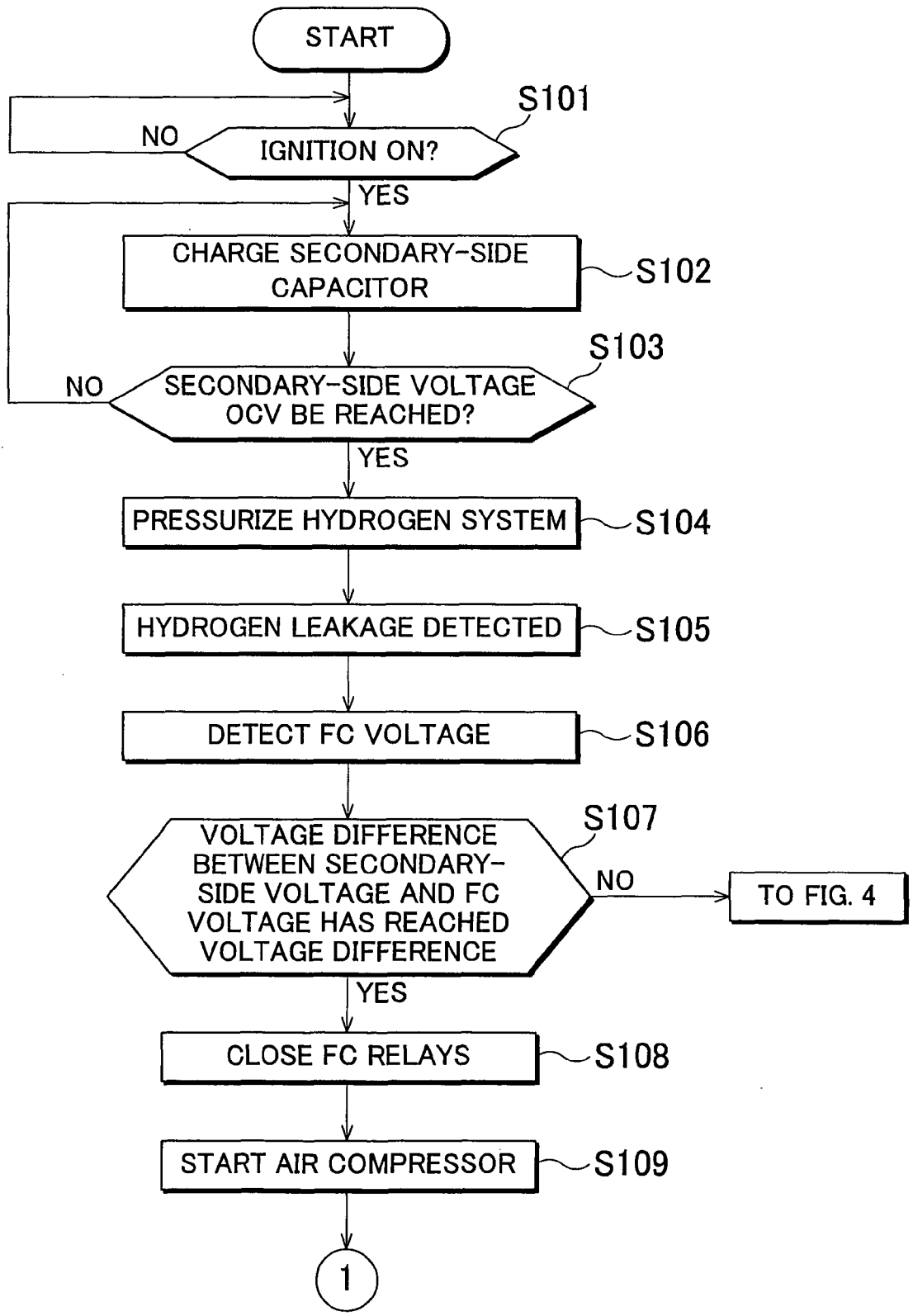
FIGS. 3A and 3B are flowcharts showing an operation performed when the fuel cell system of the embodiment of the invention starts.
Figure 3B:
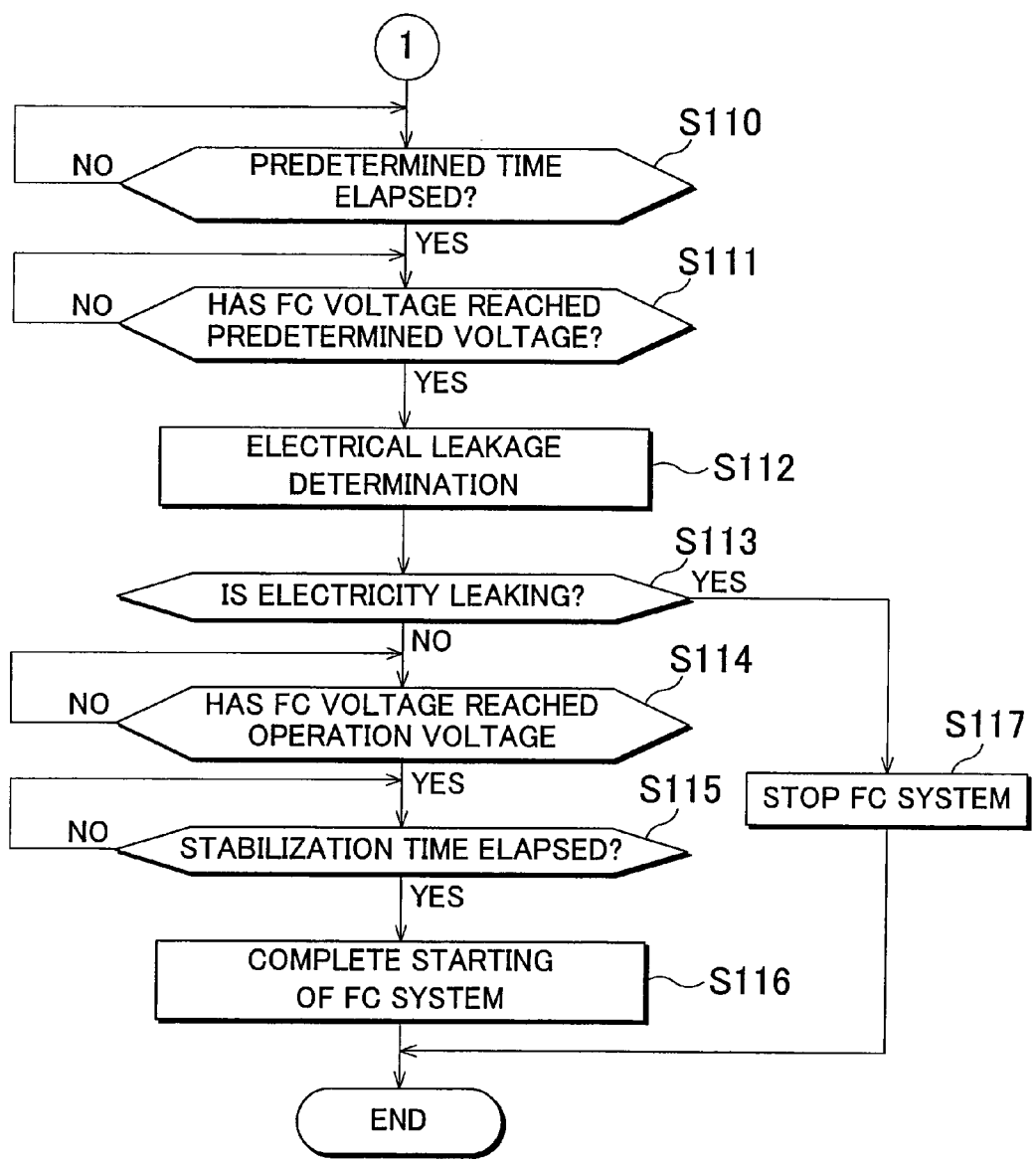

The control portion 50, as shown in step S104 in FIG. 3, outputs a command to pressurize the hydrogen system at time $t_{11}$ shown in FIG. 2. Due to this command, the hydrogen supply valve 18 opens, so that hydrogen starts to be supplied from the hydrogen tank 17 to the fuel cell 11. When hydrogen is supplied, the pressure at the fuel electrode of the fuel cell 11 rises. However, since the oxidant electrode has not been supplied with air, the electrochemical reaction does not occur within the fuel cell 11, and therefore the fuel cell 11 does not generate electricity. Thus, at this time, the FC voltage $V_F$ of the fuel cell 11 is zero, as is the case with the starting voltage of the fuel cell 11.

After the hydrogen system starts to be pressurized, the control portion 50 performs hydrogen leakage detection on the hydrogen system, as shown in step S105 in FIG. 3. The presence/absence of hydrogen leakage is determined on the basis of the proportion of reduction of the pressure that occurs after the hydrogen system is sealed. Then, if it is determined that there is no leakage of hydrogen, the control portion 50 acquires the value of the FC voltage $V_F$ of the fuel cell 11 from the voltage sensor 43, as shown in step S106 in FIG. 3. After that, the control portion 50 determines whether or not a voltage difference between the FC voltage $V_F$ and the secondary-side voltage $V_H$ that is the output voltage of the step-up/down voltage converter 13 is greater than or equal to a threshold value, as shown in step S107 in FIG. 3. The threshold value is a voltage that the control portion 50 falsely determines as being electrical leakage on the basis of the signal that is output from the electrical leakage detector 44 due to fluctuation of the current within an electrical system that includes the fuel cell 11, the step-up/down voltage converter 13, and the secondary cell 12, when the FC relays 24 are closed. The threshold value is determined by the capacitance of the electrical system. If the voltage difference is large, the possibility of outputting the signal that causes false determination is large, and therefore, the threshold value may be a voltage equal to 70% to 90% or more of the open-circuit voltage OCV. In this case, the FC relays 24 are closed when the FC voltage $V_F$ of the fuel cell 11 is lower than about 30% of the open-circuit voltage OCV.

If determining that the voltage difference between the FC voltage $V_F$ and the secondary-side voltage $V_H$ is greater than or equal to the threshold value, the control portion 50 outputs a command to close the FC relays 24 at time $t_{12}$ shown in FIG. 2, as shown in step S108 in FIG. 3. Due to this command, the FC relays 24 are closed. The control portion 50 does not perform the determination regarding electrical leakage immediately after the FC relays 24 are closed. Instead, as shown in step S109 in FIG. 3, immediately after the FC relays 24 are closed, the control portion 50 lowers the secondary-side voltage $V_H$ from the open-circuit voltage OCV to an operation voltage $V_0$, and also outputs a command to start the air compressor 19. Due to this command, the air compressor 19 starts, so that air starts to be supplied to the fuel cell 11. After the lowering of the secondary-side voltage $V_H$ to the operation voltage $V_0$ ends, the control portion 50 holds the secondary-side voltage $V_H$ at the operation voltage $V_0$. The operation voltage $V_0$ is, for example, about 90% of the open-circuit voltage OCV.

After the air compressor 19 is started and therefore air begins to be supplied to the fuel cell 11, the electrochemical reaction between the hydrogen and the oxygen in the air begins within the fuel cell 11, so that the FC voltage $V_F$ of the fuel cell 11 detected by the voltage sensor 43 gradually rises from the starting voltage, that is, zero, as shown by the line b in FIG. 2.

After the air compressor 19 is started, the control portion 50, as shown in step S110 in FIG. 3, does not perform the determination regarding electrical leakage, but waits until the elapsed time Δt following the closure of the FC relays shown in FIG. 2 reaches a predetermined time. The predetermined time is an amount of time required until a capacitor included in an internal circuit of the electrical leakage detector 44 is charged. Before the capacitor is charged, a false signal may be output from the electrical leakage detector 44, and may cause the control portion 50 to falsely determine that there is electrical leakage. At time $t_{13}$ shown in FIG. 2 that is when the time Δt elapses following the closure of the FC relays 24, the control portion 50 determines whether or not the FC voltage $V_F$ of the fuel cell has reached a predetermined voltage $V_1$, as shown in step S111 in FIG. 3. This is because while the FC voltage $V_F$ is lower than the predetermined voltage $V_1$, the fuel cell 11 is in a state of voltage rise, and if electrical leakage determination is performed during this state, there is possible that a false signal may be output from the electrical leakage detector 44. This predetermined voltage $V_1$ can be determined by the output characteristic of the fuel cell 11, or the like. For example, the predetermined voltage V1 may be set at about 10% of the open-circuit voltage OCV. In the case where the FC voltage $V_F$ is less than or equal to about 10% of the open-circuit voltage OCV, it is difficult for the electrical leakage detector 44 to detect electrical leakage, and the possibility of outputting a false signal becomes high.

At time $t_{14}$ shown in FIG. 2 when the FC voltage $V_F$ reaches the predetermined voltage $V_1$, the control portion 50 performs the determination regarding electrical leakage on the basis of the signal from the electrical leakage detector 44, as shown in step S112 in FIG. 3. Then, as shown in step S113 in FIG. 3, if it is determined that there is no electrical leakage, the control portion 50 detects the FC voltage $V_F$ via the voltage sensor 43, and waits until the FC voltage $V_F$ reaches the operation voltage $V_0$, as shown in step S114 in FIG. 3. Then, at time $t_{15}$ shown in FIG. 2, the FC voltage $V_F$ of the fuel cell 11 reaches the operation voltage $V_0$. At this time, since the secondary-side voltage $V_H$, which is the output voltage of the step-up/down voltage converter 13, is held at the operation voltage $V_0$, the FC voltage $V_F$ of the fuel cell is also held at the operation voltage $V_0$, and therefore does not rise to the open-circuit voltage OCV. During this time, the FC voltage $V_F$ of the fuel cell 11 monotonously rises. After the FC voltage $V_F$ of the fuel cell 11 reaches the operation voltage $V_0$, the control portion 50, as shown in step S115 in FIG. 3, maintains the state of the fuel cell system 100 during the period from time $t_0$ to time $t_{16}$ shown in FIG. 2 to check whether the operation of the fuel cell system 100 is stable. After checking that the fuel cell system 100 is stable, the control portion 50 completes the starting of the fuel cell system 100 as shown in step S116 in FIG. 3, and causes the fuel cell system 100 to shift to the ordinary operation at time $t_{17}$ shown in FIG. 2.

On the other hand, if determining in step S113 in FIG. 3 that there is electrical leakage, the control portion 50 stops the fuel cell system 100 as shown in step S117 in FIG. 3.

In the case where in step S107 in FIG. 3, the voltage difference between the FC voltage $V_F$ and the secondary-side voltage $V_H$, which is the output voltage of the step-up/down voltage converter 13, does not reach the threshold value, that is, in the case where the starting voltage of the fuel cell 11 is high and the voltage difference between the FC voltage $V_F$ and the secondary-side voltage $V_H$ does not reach the threshold value, a false determination of electrical leakage does not often result even if the electrical leakage detection is performed immediately after the FC relays 24 are closed. Therefore, the control portion 50 performs the determination regarding electrical leakage on the basis of the signal from the electrical leakage detector 44 immediately after the FC relays 24 are closed, as shown in steps S201 and S202 in FIG. 4. Then, as shown in step S203 in FIG. 4, if determining that there is no electrical leakage, the control portion 50 starts the air compressor 19 as shown in step S204 in FIG. 4. After the air compressor 19 is started and air begins to be supplied to the fuel cell 11, the electrochemical reaction between the hydrogen and the oxygen in the air begins within the fuel cell 11, so that the FC voltage $V_F$ of the fuel cell 11 detected by the voltage sensor 43 gradually rises from the starting voltage, and reaches the operation voltage $V_0$. After a stabilization time elapses after the FC voltage $V_F$ has reached the operation voltage $V_0$ as shown in steps S205 and S206 in FIG. 4, the control portion 50 completes the starting of the fuel cell system 100 as shown in step 5207 in FIG. 4, and shifts to the ordinary operation.

In the foregoing embodiment, after the elapse of the time Δt that is required from the closing action of the FC relays until the capacity of the electrical leakage detector 44 is charged, the determination regarding electrical leakage is performed after the FC voltage $V_F$ reaches the predetermined voltage $V_1$. Therefore, false determination of electrical leakage can be restrained, and the stop of the fuel cell system 100 based on false determination that there is electrical leakage can be restrained. Besides, since the fuel cell 11 can be started without a need to raise the FC voltage $V_F$ of the fuel cell 11 to the open-circuit voltage OCV, the consumption of the service life of the fuel cell 11 at the time of starting can be restrained, and durability of the fuel cell 11 can be maintained.

Figure 4:
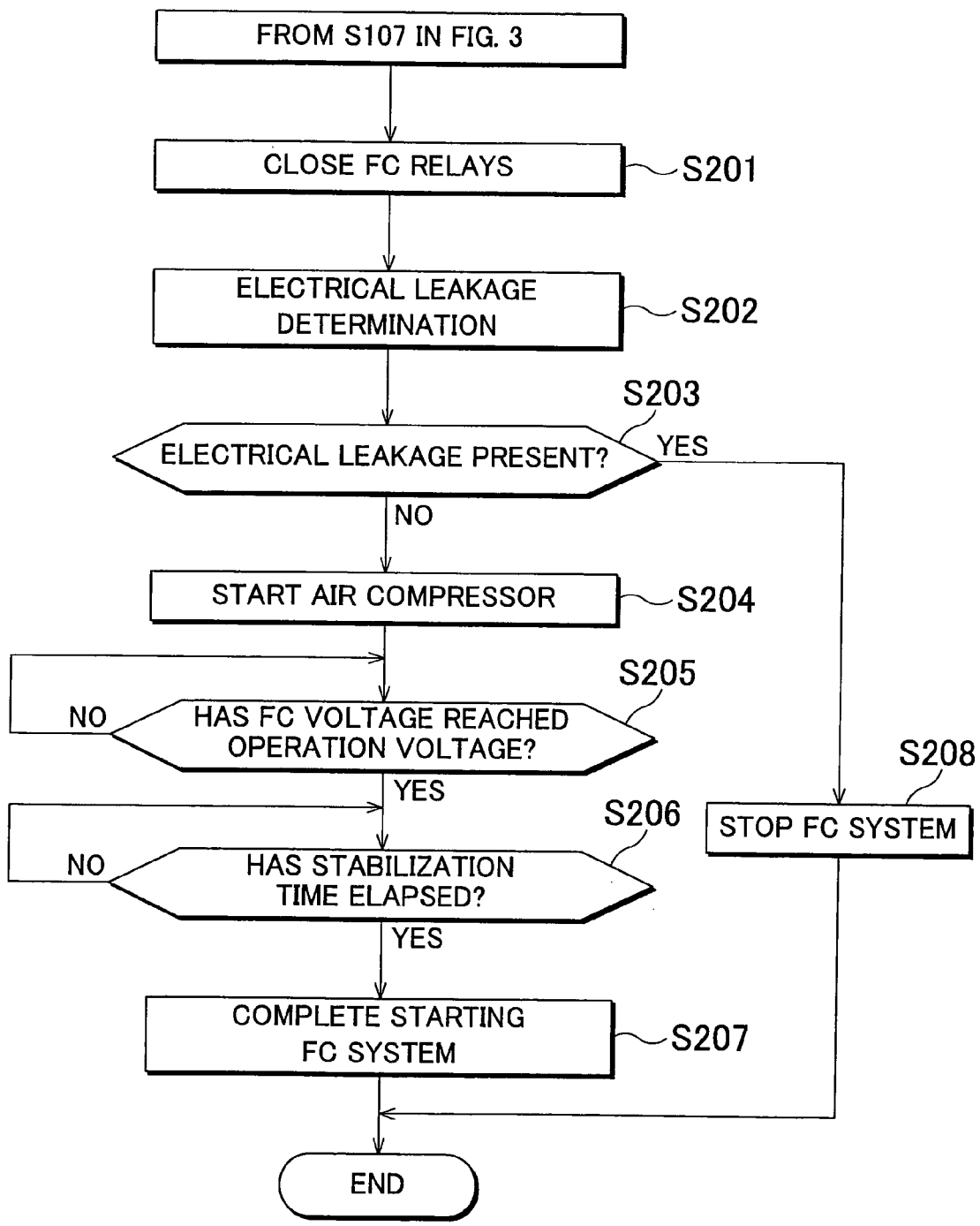
FIG. 4 is a flowchart showing the operation performed when the fuel cell system of the embodiment of the invention starts.

Besides, in the case where it is determined in step S203 in FIG. 4 that there is electrical leakage, the control portion 50 stops the fuel cell system 100 as shown in step S208 in FIG. 4.

Although in the foregoing description of the embodiment, the predetermined voltage $V_1$ is about 10% of the open-circuit voltage OCV, the predetermined voltage $V_1$ may be set at the operation voltage $V_0$ in order to further restrain the output of a false detection signal from the electrical leakage detector 44. The operation voltage $V_0$ is about 90% of the open-circuit voltage OCV. In this case, at time $t_{15}$ shown in FIG. 2 when the FC voltage $V_F$ reaches the operation voltage $V_0$, the control portion 50 performs the determination regarding the electrical leakage shown in step S112 in FIG. 3. Then, after the stabilization time for the fuel cell system 100 elapses, the control portion 50 completes the starting of the fuel cell system 100, and shifts to the ordinary operation. In this case, false determination of the presence of electrical leakage can be more restrained than in the foregoing embodiment.

Another starting operation of the fuel cell system 100 in the embodiment will be described with reference to FIG. 5. Portions that are substantially the same as those in the embodiment described above with reference to FIG. 2 to FIG. 4 are represented by the same reference characters, and the description thereof is omitted below.

FIG. 5 shows a case where when the FC relays 24 are closed at time $t_{22}$ and the air compressor 19 is started and air begins to be supplied to the fuel cell 11, the FC voltage $V_F$ of the fuel cell 11 rapidly rises from the starting voltage. In this case, the FC voltage $V_F$ reaches the operation voltage $V_0$ at time $t_{24}$ while the control portion 50 is waiting for the elapse of the predetermined time Δt for the charging of the capacitor of the electrical leakage detector 44 in step S110 shown in FIG. 3. However, until the predetermined time Δt elapses, the charging of the capacity of the electrical leakage detector 44 is not sufficient, and the possibility of false determination of electrical leakage is high if the determination regarding the electrical leakage is performed. Therefore, the control portion 50 does not perform the determination regarding electrical leakage until the predetermined time Δt elapses. Then, at time $t_{25}$ shown in FIG. 5 at which the time Δt elapses, the control portion 50 compares the FC voltage $V_F$ with the predetermined voltage $V_1$ as shown in step S111 in FIG. 3. Actually, at this time, the FC voltage $V_F$ has already reached the operation voltage $V_0$, which is higher than the predetermined voltage $V_1$. Therefore, at time $t_{25}$ shown in FIG. 5, the control portion 50 performs the determination regarding electrical leakage in step S112 shown in FIG. 3. Then, at time $t_{26}$ shown in FIG. 5 at which the stabilization time for the fuel cell system 100 has elapsed, the control portion 50 completes the starting of the fuel cell system 100, and shifts to the ordinary operation.

In this manner of starting the system, false determination of the presence of electrical leakage can be restrained, and therefore the stop of the fuel cell system 100 based on false determination of the presence of electrical leakage can be restrained. Besides, since the fuel cell 11 can be started without a need to raise the FC voltage $V_F$ of the fuel cell 11 to the open-circuit voltage OCV, the consumption of the service life of the fuel cell 11 due to the starting can be restrained, and durability thereof can be maintained.

While the invention has been described with reference to example embodiments thereof, it is to be understood that the invention is not limited to the described embodiments or constructions. To the contrary, the invention is intended to cover various modifications and equivalent arrangements. In addition, while the various elements of the disclosed invention are shown in various example combinations and configurations, other combinations and configurations, including more, less or only a single element, are also within the scope of the appended claims.

The invention claimed is:

1. A fuel cell system comprising:
a secondary cell that is chargeable and dischargeable;
a voltage converter provided between the secondary cell and a load;
a fuel cell that generates electricity through an electrochemical reaction between a fuel gas and an oxidant gas, and that supplies electric power to the load via a shared electrical path that the fuel cell shares with the voltage converter;
an FC relay that turns on and off electrical connection between the fuel cell and the shared electrical path;
an electrical leakage detector that detects electrical leakage in an electrical system that includes the secondary cell, the voltage converter, and the fuel cell; and
a control portion programmed to perform determination regarding electrical leakage,
wherein the control portion comprises:
a starting device that starts the fuel cell by raising voltage of the fuel cell from a starting voltage to an operation voltage that is lower than an open-circuit voltage; and
an electrical leakage determination device programmed to determine electrical leakage after a predetermined time elapses, after the FC relay is closed, while a voltage difference between the voltage of the fuel cell and voltage supplied from the voltage converter to the load is greater than a predetermined threshold value,
wherein the predetermined time related to the electrical leakage determination device is a time required until a capacitor included in an internal circuit of the electrical leakage detector is charged.

2. The fuel cell system according to claim 1, wherein the electrical leakage determination device is programmed to determine electrical leakage after the voltage of the fuel cell reaches a predetermined voltage after the FC relay is closed.

3. The fuel cell system according to claim 2, wherein the predetermined voltage related to the electrical leakage determination device is the operation voltage.

4. An electric vehicle comprising the fuel cell system according to claim 1.

5. A fuel cell system comprising:
a secondary cell that is chargeable and dischargeable;
a voltage converter provided between the secondary cell and a load;
a fuel cell that generates electricity through an electrochemical reaction between a fuel gas and an oxidant gas, and that supplies electric power to the load via a shared electrical path that the fuel cell shares with a voltage converter;
an FC relay that turns on and off electrical connection between the fuel cell and the shared electrical path;
an electrical leakage detector that detects electrical leakage in an electrical system that includes the secondary cell, the voltage converter, and the fuel cell; and
a control portion programmed to determine electrical leakage, and which includes
a start portion that starts the fuel cell by raising voltage of the fuel cell from a starting voltage to an operation voltage that is lower than an open-circuit voltage, and
an electrical leakage determination portion programmed to determine electrical leakage after a predetermined time elapses, after the FC relay is closed, while a voltage difference between the voltage of the fuel cell and voltage supplied from the voltage converter to the load is greater than a predetermined threshold value,
wherein the predetermined time related to the electrical leakage determination portion is a time required until a capacitor included in an internal circuit of the electrical leakage detector is charged.

6. A control method for a fuel cell system that includes:
a secondary cell that is chargeable and dischargeable; a voltage converter provided between the secondary cell and a load; a fuel cell that generates electricity through an electrochemical reaction between a fuel gas and an oxidant gas, and that supplies electric power to the load via a shared electrical path that the fuel cell shares with a voltage converter; an FC relay that turns on and off electrical connection between the fuel cell and the shared electrical path; and an electrical leakage detector that detects electrical leakage in an electrical system that includes the secondary cell, the voltage converter, and the fuel cell, the control method comprising:
starting the fuel cell by raising voltage of the fuel cell from a starting voltage to an operation voltage that is lower than an open-circuit voltage; and
performing the determination regarding electrical leakage after a predetermined time elapses, when the FC relay is closed while a voltage difference between the voltage of the fuel cell and voltage supplied from the voltage converter to the load is greater than a predetermined threshold value,
wherein the predetermined time is a time required until a capacitor included in an internal circuit of the electrical leakage detector is charged.

7. The fuel cell system according to claim 5, wherein the electrical leakage determination portion is programmed to determine electrical leakage after the voltage of the fuel cell reaches a predetermined voltage after the FC relay is closed.

8. The fuel cell system according to claim 7, wherein the predetermined voltage related to the electrical leakage determination portion is the operation voltage.

9. An electric vehicle comprising the fuel cell system according to claim 5.

* * * * *

UNITED STATES PATENT AND TRADEMARK OFFICE
CERTIFICATE OF CORRECTION

| | | |
|---|---|---|
| PATENT NO. | : 9,160,018 B2 | |
| APPLICATION NO. | : 13/258719 | |
| DATED | : October 13, 2015 | |
| INVENTOR(S) | : Yoshida et al. | |

It is certified that error appears in the above-identified patent and that said Letters Patent is hereby corrected as shown below:

In the Specification

Column 1, line 5, after the title, insert -- This is a 371 national phase application of PCT/IB2010/000563 filed 18 March 2010, which claims priority to Japanese Patent Application No. 2009-085378 filed 31 March 2009, the contents of which are incorporated herein by reference --.

Column 7, line 43, change "$t_0$ to time $t_{16}$" to -- $t_{15}$ to time $t_{16}$ --.

Column 8, line 11, change "in step 5207" to -- in step S207 --.

Signed and Sealed this
Twenty-third Day of August, 2016

Michelle K. Lee
*Director of the United States Patent and Trademark Office*